United States Patent
Satyanarayana et al.

(10) Patent No.: US 10,679,430 B2
(45) Date of Patent: Jun. 9, 2020

(54) TOLL BOOTH ADDED SECURITY TO CODE SCANNER

(71) Applicant: CA, Inc., New York, NY (US)

(72) Inventors: Deepak Dhondaley Satyanarayana, Karnataka (IN); Sharath Kumar, Karnataka (IN); Sanjay Rai, Karnataka (IN); Stephen Prasad, Karnataka (IN)

(73) Assignee: CA, Inc., New York, NY (US)

( * ) Notice: Subject to any disclaimer, the term of this patent is extended or adjusted under 35 U.S.C. 154(b) by 0 days.

(21) Appl. No.: 16/053,970

(22) Filed: Aug. 3, 2018

(65) Prior Publication Data

US 2020/0043248 A1 Feb. 6, 2020

(51) Int. Cl.
*G08G 1/065* (2006.01)
*G07B 15/06* (2011.01)
*H04W 4/44* (2018.01)
*G06Q 20/40* (2012.01)

(52) U.S. Cl.
CPC ....... *G07B 15/063* (2013.01); *G06Q 20/4016* (2013.01); *H04W 4/44* (2018.02)

(58) Field of Classification Search
CPC .... G07B 15/063; H04W 4/44; G06Q 20/4016
USPC ........................................................ 340/928
See application file for complete search history.

(56) References Cited

U.S. PATENT DOCUMENTS

| | | | | |
|---|---|---|---|---|
| 4,303,904 A | * | 12/1981 | Chasek | G07F 7/02 235/384 |
| 5,451,758 A | * | 9/1995 | Jesadanont | G07B 15/063 235/384 |
| 9,633,243 B1 | * | 4/2017 | Geist | G06K 7/10366 |
| 2001/0020198 A1 | * | 9/2001 | Wilson | B67D 7/067 700/232 |
| 2005/0182674 A1 | * | 8/2005 | Yeo | G06Q 20/20 705/13 |
| 2007/0011099 A1 | * | 1/2007 | Sheehan | G06Q 20/32 705/65 |
| 2010/0088228 A1 | * | 4/2010 | Febonio | G06Q 20/105 705/41 |
| 2010/0312618 A1 | * | 12/2010 | Ramsdale | G06Q 20/40 705/13 |
| 2015/0088617 A1 | * | 3/2015 | Geist | G06Q 20/26 705/13 |

(Continued)

*Primary Examiner* — Naomi J Small
(74) *Attorney, Agent, or Firm* — Shook, Hardy & Bacon L.L.P.

(57) ABSTRACT

Methods, server, devices and registered terminals for requiring approval of toll charges are provided. A server receives, from a fixed communication device at a toll booth location, a tollway transponder identifier of a vehicle tollway transponder on a vehicle. The server determines whether a registered terminal is associated with the tollway transponder identifier. Responsive to determining that the registered terminal is associated with the tollway transponder identifier, a toll approval request message is transmitted to the registered terminal, which sends a response message back to the server. The server determines if a location of the registered terminal is within a defined distance from the toll booth location. Responsive to the location of the registered terminal being within the defined distance, the server triggers a toll charge against an account associated with the tollway transponder identifier when the response message indicates approval of the toll.

20 Claims, 11 Drawing Sheets

(56) References Cited

U.S. PATENT DOCUMENTS

| | | | |
|---|---|---|---|
| 2015/0134427 A1* | 5/2015 | Borras | H04W 4/48 |
| | | | 705/13 |
| 2015/0134428 A1* | 5/2015 | Li | G06Q 20/327 |
| | | | 705/13 |
| 2015/0302738 A1* | 10/2015 | Geerlings | G07C 9/00571 |
| | | | 340/5.25 |
| 2017/0127230 A1* | 5/2017 | Enriquez | G06Q 20/40145 |
| 2017/0243410 A1* | 8/2017 | Caballero | G06Q 20/40 |

* cited by examiner

TOLL BOOTH ADDED SECURITY TO CODE SCANNER

FIELD

Some embodiments described herein relate to toll booth scanners, and in particular to toll approval security.

BACKGROUND

The number of tollways is increasing throughout the world. Many tollways use tollway transponders that are associated with an account of the tollway transponder owner. When the tollway transponder approaches a tollway sensor at a tollbooth or an open road toll, the tollway sensor scans the tollway transponder to obtain an identifier that is used to access the account of the tollway transponder owner to trigger a toll charge against the account.

There are generally two types of tollway transponders. The first type is an enclosed transponder device that is generally mounted on the inside of the windshield of a vehicle behind the rearview mirror. The second type is a sticker that is mounted on the inside of the windshield of a vehicle behind the rearview mirror. In some situations, the windshields have material in them that interferes with the operation of the transponder. In these situations, a bumper-mounted transponder is used.

One problem that can occur is the theft of the tollway transponder. The theft can include copying the sticker and using the copy of the sticker in another vehicle. Unless the owner is aware of the theft or copying of the sticker, toll charges will be deducted against the account of the owner of the tollway transponder.

SUMMARY

Some embodiments are directed to a method in a server device for approving or disapproving a toll charge is provided. The method includes receiving, from a fixed communication device at a toll booth location, a tollway transponder identifier of a vehicle tollway transponder on a vehicle, and determining whether a registered terminal is associated with the tollway transponder identifier. Responsive to determining that the registered terminal is associated with the tollway transponder identifier, the method transmits a toll approval request message to the registered terminal. Responsive to receiving a response message from the registered terminal to the toll approval request message, the method determines if a location of the registered terminal is within a defined distance from the toll booth location. Responsive to the location of the registered terminal being within the defined distance, a toll charge is triggered against an account associated with the tollway transponder identifier when the response message indicates approval of the toll.

The method may further include responding to the location of the registered terminal being within the defined distance and to receiving a response message indicating lack of approval of the toll, by the method preventing a toll charge against the account associated with the tollway transponder identifier.

The method may further include responsive to not receiving a response from the registered terminal within the allocated time period, determining a location of the registered terminal responsive to the registered terminal being detectable after the allocated time period has expired. The method compares the location of the registered terminal to the toll booth location. Responsive to the location of the registered terminal being within the defined distance of the toll booth location, the method triggers a toll charge against the account associated with the tollway transponder identifier. Responsive to the location of the registered terminal being outside of the defined distance, the method prevents a toll charge against the account associated with the tollway transponder identifier.

Corresponding server devices are disclosed. In some embodiments, a server device includes a processor and a memory coupled to the processor, wherein the memory stores computer program instructions that are executed by the processor to perform operations that include receiving, from a fixed communication device at a toll booth location, a tollway transponder identifier of a vehicle tollway transponder on a vehicle, the tollway transponder identifier sensed by a toll booth sensor of a toll booth. Responsive to determining that a registered terminal is associated with the tollway transponder identifier, the operations further include transmitting a toll approval request message to the registered terminal. Responsive to receiving a response message from the registered terminal to the toll approval request message, the operations further include determining if a location of the registered terminal is within a defined distance of a toll booth location. Responsive to the location of the registered terminal being within the defined distance, the operations include triggering a toll charge against an account associated with the tollway transponder identifier when the response message indicates approval of the toll.

Registered terminals are also disclosed. In some embodiments, a registered terminal includes a processor configured to perform operations that include receiving, from the server device via the communication interface, a toll approval request message for approval of a toll, the toll approval request message comprising a location of a toll booth requesting toll approval and an amount of the toll and comprising a location of the toll booth. The operations further include comparing the location of the toll booth with a location of the registered terminal. Responsive to the location of the toll booth being outside a predetermined distance from the location of the registered terminal, the operations send a response message to the server device via the communication interface indicating a lack of approval of the toll against an account associated with a tollway transponder identifier that is associated with the registered terminal. Responsive to the location of the toll booth being within the predetermined distance from the location of the registered terminal, the operations include determining whether approval is to be provided in response to the toll approval request. Responsive to determining that approval is to be provided, the operations transmit, via the communication interface, a response message to the server device indication approval of the toll against the account associated with the tollway transponder identifier. Responsive to determining that approval it not to be provided, the operations transmit, via the communication interface, a response message indicating lack of approval of the toll.

The registered terminal may perform further operations including obtaining a planned travel route of the registration terminal. The operations further include transmitting, to the server device via the communication interface, a pre-authorization message containing an indication of the planned travel route and an indication of pre-authorization to charge accumulated tolls along the planned travel route It is noted that aspects of the inventive concepts described with respect to one embodiment may be incorporated in different embodiments although not specifically described relative thereto. That is, all embodiments or features of any embodiments can be combined in any way and/or combination. These and other objects or aspects of the present inventive concepts are explained in detail in the specification set forth below.

Advantages that may be provided by various of the concepts disclosed herein include reducing occurrence of fraudulent toll charges, requiring an approval message from a registered terminal to be received to trigger a toll charge against an account associated with a tollway transponder identifier or alternatively triggering a toll charge against the account if the location of the registered terminal is within a defined distance of a toll booth location, and rejecting a toll charge if a message indicating lack of approval is received from the registered terminal or if the registered terminal is outside of the defined distance.

Other methods, server devices, and computer program products, and advantages will be or become apparent to one with skill in the art upon review of the following drawings and detailed description. It is intended that all such additional systems, methods, or computer program products and advantages be included within this description, be within the scope of the present inventive concepts, and be protected by the accompanying claims.

BRIEF DESCRIPTION OF THE DRAWINGS

The accompanying drawings are included to provide a further understanding of the disclosure and are incorporated in and constitute a part of this application. In the drawings.

DETAILED DESCRIPTION OF EMBODIMENTS

Figure 1:
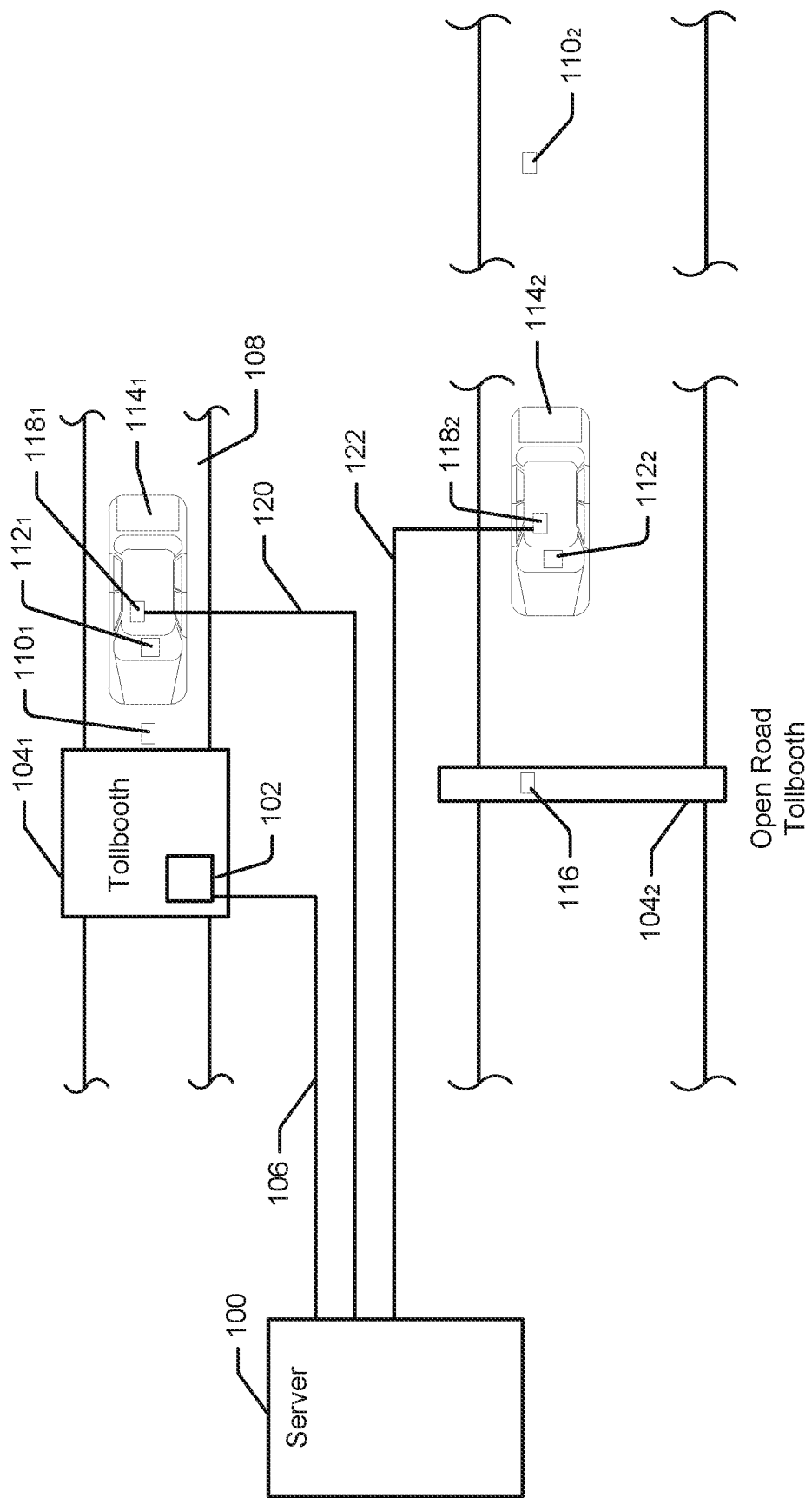
FIG. 1 is a block diagram illustrating an exemplary environment of a server device communicating with a fixed communication device and a registered terminal according to some embodiments.

Embodiments of the present inventive concepts now will be described more fully hereinafter with reference to the accompanying drawings. The inventive concepts may, however, be embodied in many different forms and should not be construed as limited to the embodiments set forth herein. Rather, these embodiments are provided so that this disclosure will be thorough and complete, and will fully convey the scope of the inventive concepts to those skilled in the art. Like numbers refer to like elements throughout.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present inventive concepts. As used herein, the term "or" is used nonexclusively to include any and all combinations of one or more of the associated listed items.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises," "comprising," "includes" or "including" when used herein, specify the presence of stated features, integers, steps, operations, elements, or components, but do not preclude the presence or addition of one or more other features, integers, steps, operations, elements, components, or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Some embodiments described herein provide methods or devices for triggering or preventing a charge against an account associated with a tollway transponder identifier of a tollway transponder. According to some embodiments, a tollway transponder identifier of a vehicle tollway transponder on a vehicle is received from a fixed communication device at a toll booth location. A determination is made of whether a registered terminal is associated with the tollway transponder identifier. Responsive to determining that the registered terminal is associated with the tollway transponder identifier, a toll approval request message is transmitted to the registered terminal. Responsive to receiving a response message from the registered terminal to the toll approval request message: a determination is made if a location of the registered terminal is within a defined distance from the toll booth location; and responsive to the location of the registered terminal being within the defined distance, a toll charge is triggered against an account associated with the tollway transponder identifier when the response message indicates approval of the toll. Responsive to the location of the registered terminal being within the defined distance and responsive to receiving a response message indicating lack of approval of the toll, preventing a toll charge against the account associated with the tollway transponder identifier.

FIG. 1 is a block diagram illustrating an environment for triggering a toll charge against an account associated with a tollway transponder and preventing a toll charge against the account according to an embodiment. As shown, a server device 100 communicates with a fixed communication device 102 of a toll booth 104$_1$ via communication path 106. The communication path 110 may be a wired and/or wireless communication path. While there is a single fixed communication device 102 shown in toll booth 104$_1$, there may be multiple fixed communication devices such as a fixed communication device in each tollbooth 104$_1$ and in open road tollbooth 104$_2$.

In the description that follows, tollbooth 104 shall be used to designate tollbooth 104$_1$ and tollbooth 104$_2$. In many tollbooth locations, there are multiple tollbooths 104$_1$. Each tollbooth lane 108 of a tollbooth 104$_1$ has a sensor 110 that emits radio frequencies to communicate with the vehicle tollway transponder 112 typically located on the windshield of vehicle 114. The open road tollbooth 104$_2$ may have multiple sensors 110$_2$, such as one or more per lane of the roadway under the open road tollbooth 104$_2$. The vehicle tollway transponder 112 may be an enclosed transponder or a sticker. For tollbooth locations that only have an open road tollbooth 104$_2$, one or more cameras 116 are used to take pictures of the vehicle and driver. The pictures of the vehicle and driver are used to send the owner of the vehicle an invoice for the accumulated tolls of the toll associated with each open road tollbooth 104$_2$ the vehicle was driven underneath when there is no vehicle tollway transponder present in or on the vehicle.

As further described in FIG. 2, the server device 110 communicates with registered terminals 118$_1$, 118$_2$ associated with the vehicle tollway transponders 112$_1$, 112$_2$ via wireless communications represented by lines 120, 122, respectively.

Figure 2A:
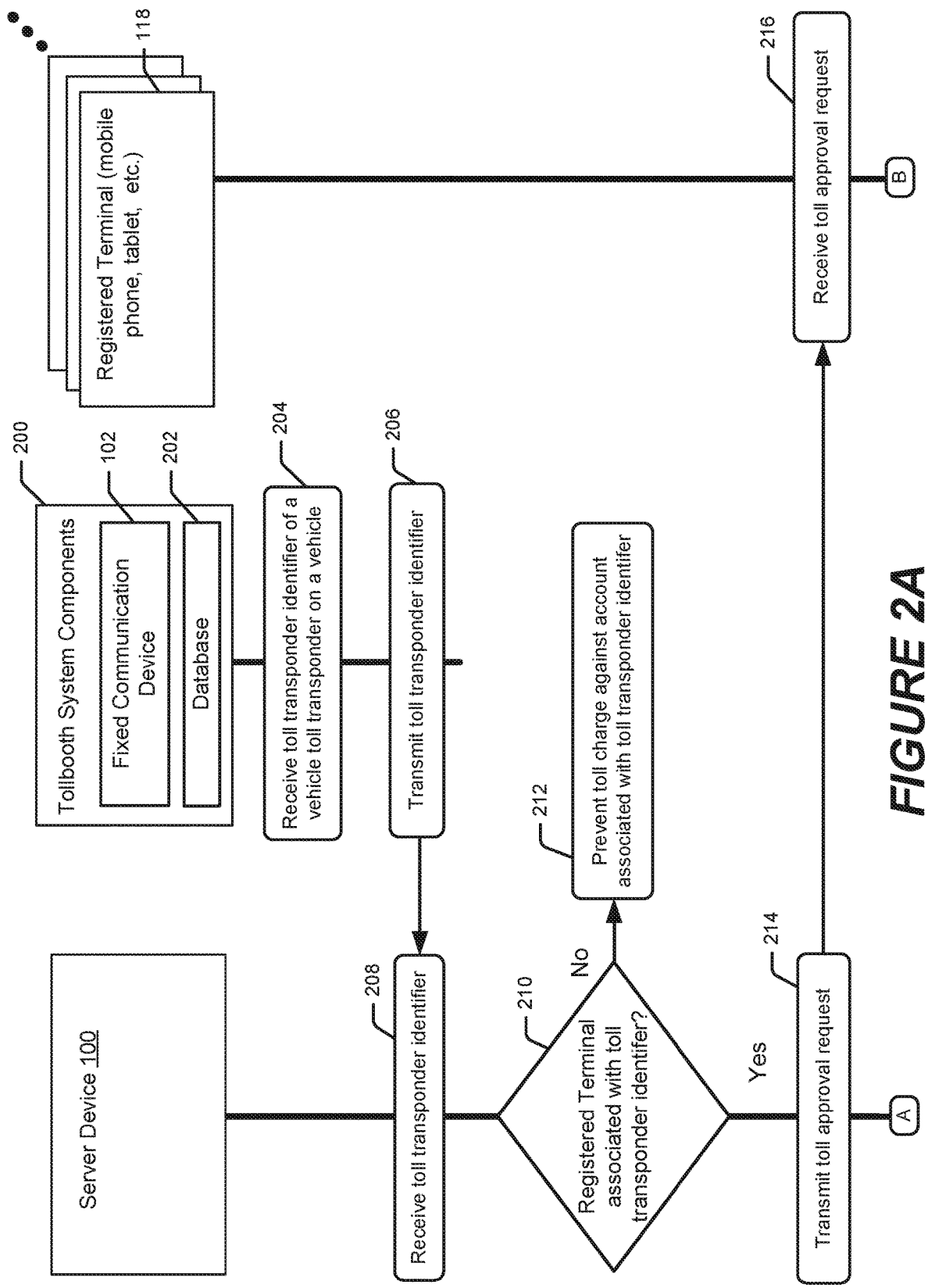
FIGS. 2A-2B are an exemplary signaling diagram for illustrating procedures according to an embodiment.
Figure 2B:
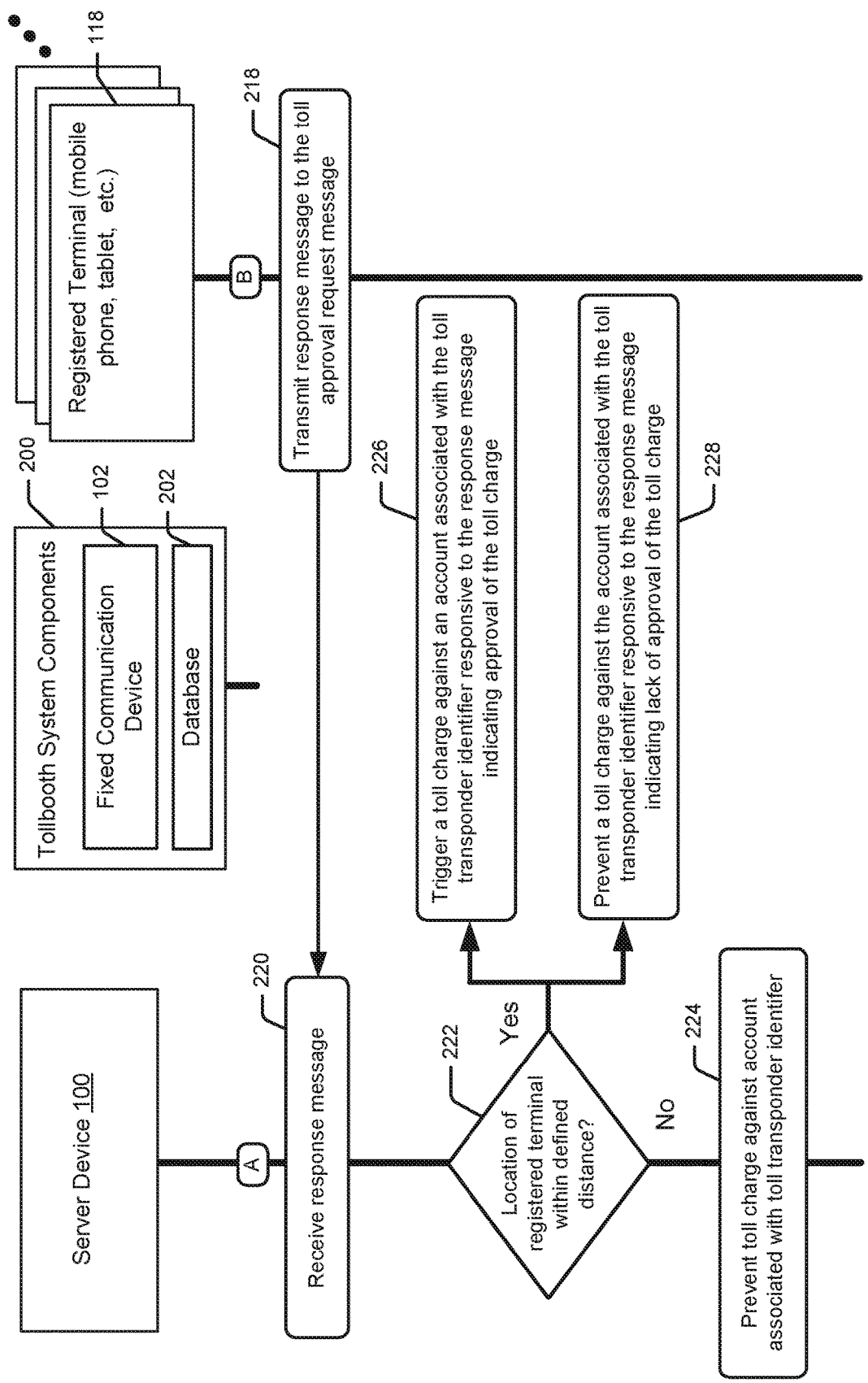

FIGS. 2A and 2B are a signaling diagram of an exemplary procedure that includes triggering a charge or preventing a charge from an account associated with a tollway transponder. The procedures of FIGS. 2A and 2B involve the server device 100, tollbooth system components 200, and registered terminal 118. The system components 200 include fixed communication device 102 and a database 202. The database 202 stores information such as tollway transponder identifiers, account information associated with one or more tollway transponder identifiers, and information regarding registered terminals associated with one or more tollway transponder identifiers.

Initially at step 204, the fixed communication device 102 receives a tollway transponder identifier of a vehicle tollway transponder 112 of a vehicle 114 that was sensed by sensor 110 as the vehicle 114 came within range of the sensor 110. The fixed communication device 102 transmits the tollway transponder identifier to the server device 100 at step 206. The server device 100 receives the tollway transponder identifier at step 208.

Figure 3:
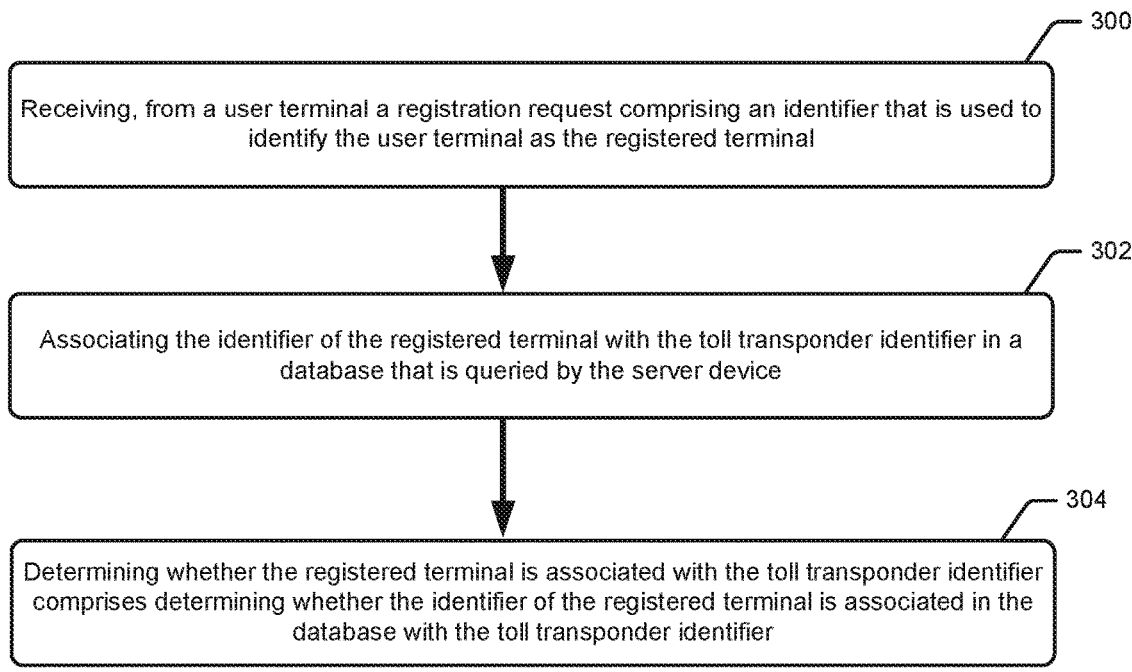
FIG. 3 is a flowchart illustrating operations to register a terminal according to some embodiments.

At step 210, the server device 100 determines whether there is a registered terminal 118 associated with the received tollway transponder identifier. The registered terminal 118 may be a cell phone, a tablet, a PDA, and other types of devices that communicate wirelessly. In an embodiment, the server device 100 accesses the database 202 to search for the received tollway transponder identifier to determine if the entry for the received tollway transponder identifier has a registered terminal associated with the received tollway transponder identifier. Turning of FIG. 3, the user of the vehicle tollway transponder 112, such as the vehicle owner, registers a user terminal by sending a registration request to the server device 100 or a registration server (not shown) that register the user terminal on behalf of the server device 100. At step 300, the registration request is received from the user terminal and comprises an identifier that is used to identify the user terminal as the registered terminal and other information that is needed to communicate with the registered terminal, such as for example, a wireless device phone number, an e-mail address, and the like. At step 302, the identifier of the registered terminal is associated with the tollway transponder identifier in the database 202 that is queried by the server device 100. At step 304, determining whether the registered terminal is associated with the tollway transponder identifier comprises determining whether there is an identifier of a registered terminal associated in the database 202 with the tollway transponder identifier.

The server device 100 also obtains account information regarding an account associated with the tollway transponder identifier from the database 202 or another database. In an alternate embodiment, the fixed communication device provides information of any registered terminal associated with the tollway transponder identifier and sends the information of any registered terminal with the transmission of the tollway transponder identifier to the server device 100. The account information may be sent to the server device 100 with the transmission of the tollway transponder identifier to the server device 100.

At step 212, the server device 100 prevents a toll charge against the account associated with the received tollway transponder identifier responsive to there being no registered terminal associated with the received tollway transponder identifier.

At step 214, the server device 100 transmits a toll approval request to the registered terminal 118 associated with the received tollway transponder identifier responsive to determining that the registered terminal 118 is associated with the received tollway transponder identifier. The toll approval request contains a request to approve the toll charge associated with the tollbooth 104 that sensed the tollway transponder identifier of the vehicle tollway transponder 112 of vehicle 114. The server device 100 transmits the toll approval request through a wireless network such as a cellular network to the registered terminal 118.

The registered terminal 118 receives the toll approval request at step 216. The toll approval request may be any one of a multitude of forms. For example, the toll approval request may be an instant message that requires a Yes/No response, a message that provides a button to press to indicate approval of the toll charge and a button to indicate lack of approval of the toll charge, etc.

In an embodiment, an application on the registered terminal 118 is used. In this embodiment, the toll approval request is received by the application. The application displays an interface for the user to use to respond to the toll approval request. The user may press an icon in the application to indicate approval of the toll or another icon to indicate lack of approval of the toll.

The registered terminal 118 transmits a response message to the toll approval request message that indicates approval of the toll or lack of approval of the toll at step 218. The server device receives the response message at step 220.

At step 222, the server device 100 determines if the location of the registered terminal 118 is within a defined distance of the location of the tollbooth that sensed the vehicle tollway transponder 112. The defined distance is based on the expected speed of the vehicle 114, the bandwidth typically available to transmit the toll approve request and receive a response, and the time a user typically takes to select a response. The location of the registered terminal 118 may be provided by the registered terminal 118 with the response message to the toll approval request message or sent separately from the response message. Alternatively, the location of the registered terminal 118 may be provided by a cellular base station or other wireless network node.

If the location of the registered terminal 118 is not within the defined distance, the server device 100 prevents a toll charge against the account associated with the tollway transponder identifier. The location of the registered terminal 118 may not be within the defined distance for a variety of reasons. For example, the registered terminal 118 may not be in the vehicle 114, the time it took for the response message to be transmitted took longer than usual, etc.

Figure 4:
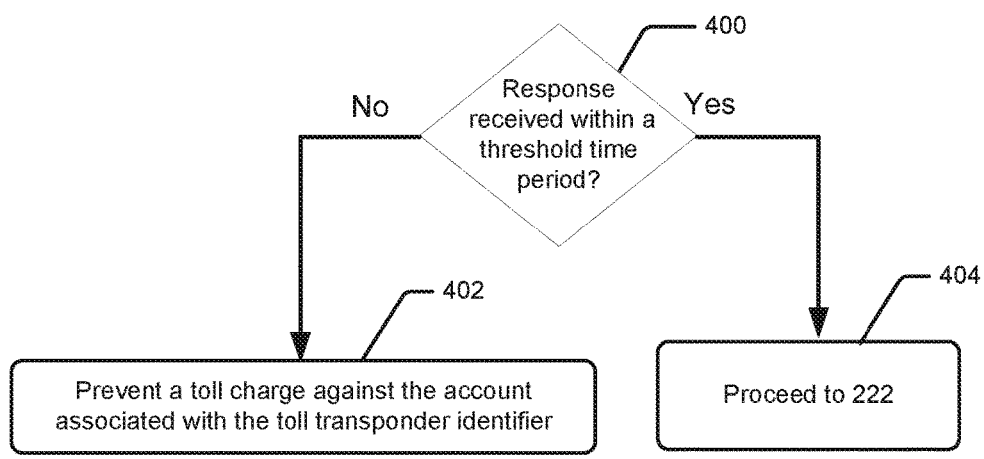
FIG. 4 is a flowchart illustrating operations to prevent a toll charge according to some embodiments.
Figure 5:
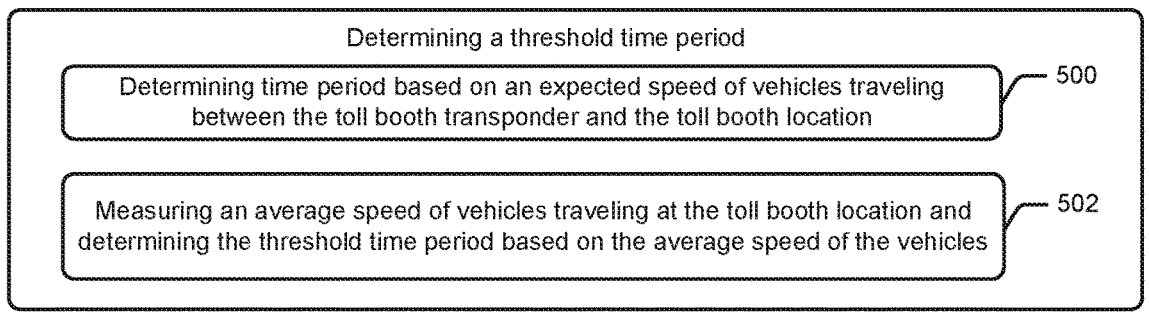
FIG. 5 is a flowchart illustrating operations to determine a threshold time period according to some embodiments.

Turning to FIG. 4, to provide a time period for the response message to be received, a threshold time period is used. The threshold time period can be based on the speed of the vehicles. FIG. 5 illustrates embodiments of determining a threshold time period. At operation 500, the time period is determined based on an expected speed of vehicles traveling between the toll booth transponder and the toll booth location. At operation 502, an average speed of vehicles traveling at the toll booth location is measured and the threshold time period is determined based on the average speed of the vehicles.

In the embodiment described in FIG. 4, at step 400, a determination is made whether the response message is received within a threshold time period. If the response message is not received within the threshold time period, the server device 100 prevents a toll charge against the account associated with the tollway transponder identifier. If the response message is received within the threshold time period, the server device 100 at step 440 proceeds to step 222 by determining if the location of the registered terminal 118 is within the defined distance of the location of the tollbooth that sensed the vehicle tollway transponder 112 at step 222.

Returning to FIG. 2B, at step 226, if the location of the registered terminal is within the defined distance, the server device 100 triggers a toll charge against an account associated with the tollway transponder identifier responsive to the response message indicating approval of the toll. At step 228, the server device 100 prevents a toll charge against the account associated with the tollway transponder identifier responsive to the response message indicating lack of approval of the toll.

Figure 6:
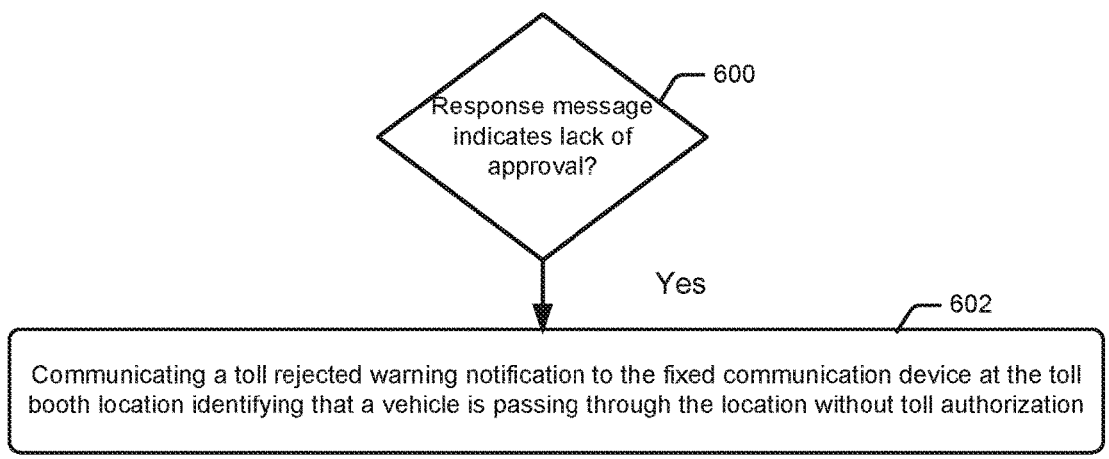
FIG. 6 is a flowchart illustrating operations to communicate a toll rejected warning notification according to some embodiments.

Turning to FIG. 6, a determination is made as to whether the response message indicates lack of approval of the toll at step 600. When the response message indicates lack of approval of the toll, the server device 100 communicates a toll rejected warning notification to the fixed communication device 102 at the toll booth location at step 602. The toll rejected warning notification identifies that a vehicle is passing through the toll booth location without toll authorization. The fixed communication device 102 may take a picture of the vehicle and driver with camera 116 and send an invoice to the owner of the vehicle.

Figure 7:
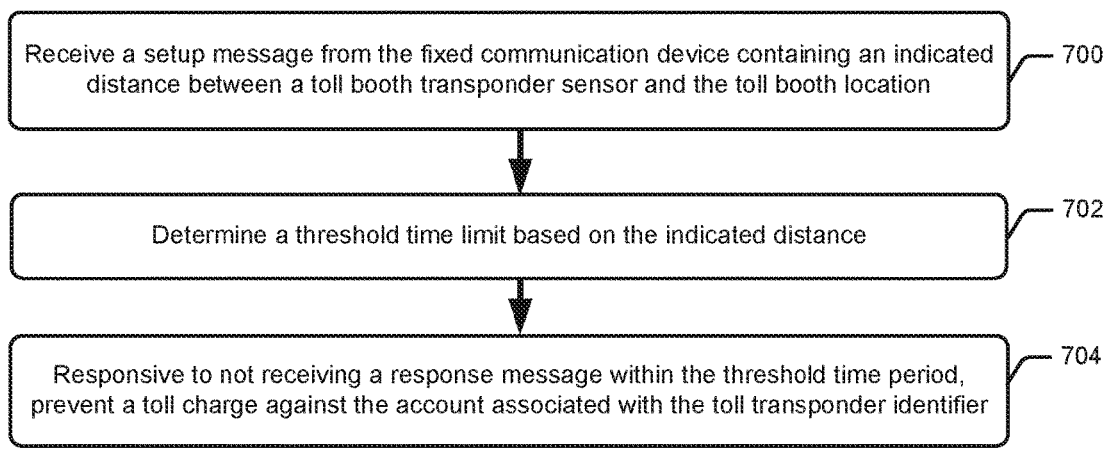
FIG. 7 is a flowchart illustrating operations to prevent a toll charge against an account based on a threshold time limit according to some embodiments.

FIG. 7 illustrates operations to prevent a toll charge against an account associated with a tollway transponder identifier. At step 700, a setup message is received from the fixed communication device 102 containing an indicated distance between a toll booth sensor 110 and the toll booth location. A threshold time limit is determined based on the indicated distance at step 702. For example, the time a vehicle travels the indicated distance based on an expected speed of the vehicle can be determined and this time may be set to be the threshold time limit. At step 704, responsive to not receiving a response message from the registered terminal 118 within the threshold time period, the server device 100 prevents a toll charge against the account associated with the tollway transponder identifier.

Figure 8:
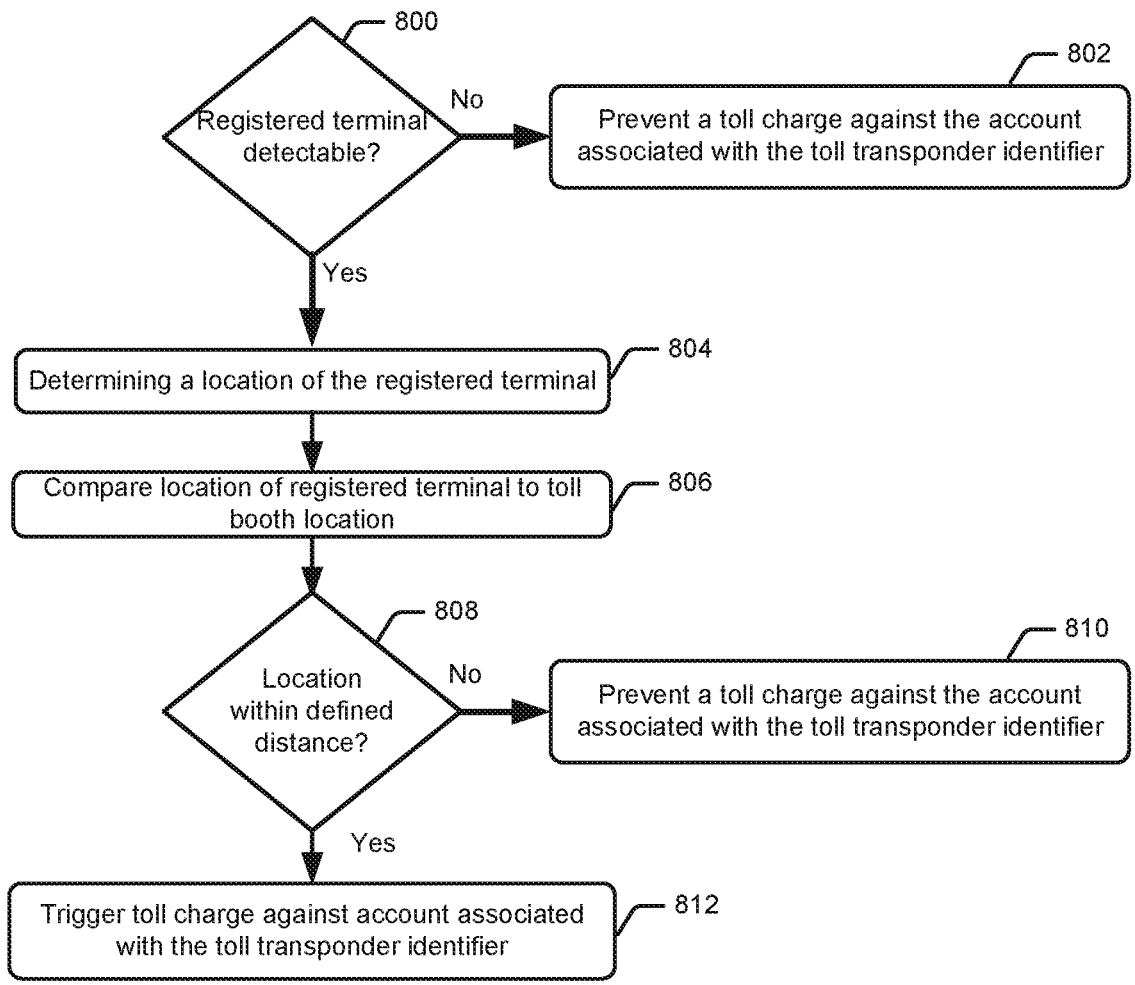
FIG. 8 is a flowchart illustrating operations to trigger a toll charge or prevent a toll charge based on the registered terminal being detectable and the location of the registered terminal according to some embodiments.

FIG. 8 illustrates an embodiment where the server device 100 triggers a toll charge against the account associated with the vehicle tollway transponder 112 based on the registered terminal being detectable and being within a defined distance of the tollbooth. At step 800, a determination is made whether the registered terminal 118 is detectable. The determination can be made by sending a ping signal to the registered terminal 118 and receiving a response, by sending a request to a network node of a network used to communicate with the registered terminal 118 to determine if the registered terminal 118 is on-line, by detecting a transmission from the registered terminal 118, and the like. If the registered terminal 118 is not detectable, the server device 100 prevents a toll charge against the account associated with the tollway transponder identifier at step 802.

If the registered terminal 118 is detectable, the location of the registered terminal 118 is determined at step 804. The location of the registered terminal 118 may be determined as previously described with respect to step 222. A step 806, the location of the registered terminal 118 is compared to the toll booth location that sensed the vehicle tollway transponder 112. A determination is made whether the location of the registered terminal 118 is within a defined distance of the toll booth location at step 808. Step 808 is similar to step 222.

At step 810, the server device 100 prevents a toll charge against the account associated with the tollway transponder identifier responsive to the location of the registered terminal 118 not being within the defined distance. At step 812, if the location of the registered terminal is within the defined distance, the server device 100 triggers a toll charge against an account associated with the tollway transponder identifier.

Figure 9:
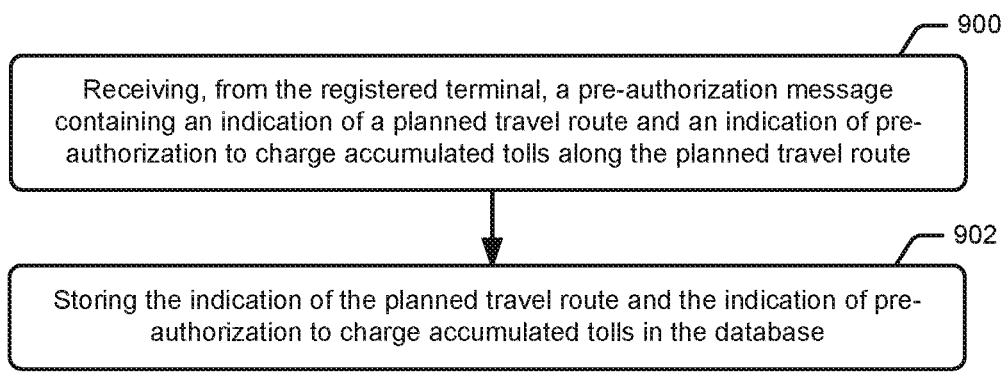
FIG. 9 is a flowchart illustrating operations to pre-authorize to charge accumulated tolls along a planned travel route according to some embodiments.

Turning to FIG. 9, an owner of the vehicle tollway transponder 112 may want to pre-authorize to charge accumulated tolls along a planned travel route. The registered terminal 118 is used to send a pre-authorization message. At step 900, the server device 100 receives, from the registered terminal 118, a pre-authorization message containing an indication of a planned travel route and an indication of a pre-authorization to charge accumulated tolls along the planned travel route. At step 902, the indication of the planned travel route and the indication of the pre-authorization to charge accumulated tolls along the planned travel route are stored in the database 202 and are associated with the tollway transponder identifier in which the registered terminal 118 is associated.

Figure 10:
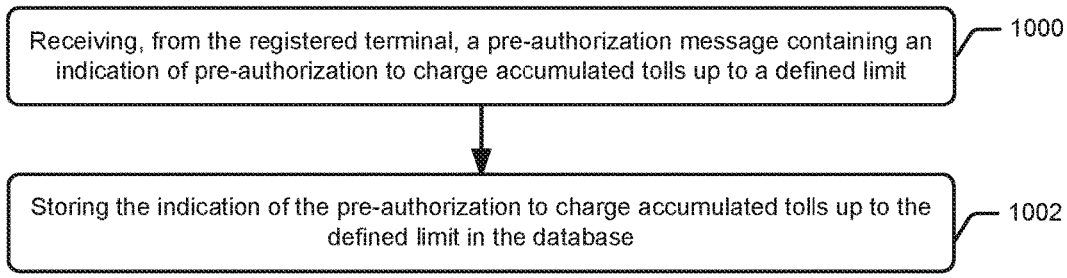
FIG. 10 is a flowchart illustrating operations to pre-authorize to charge accumulated tolls up to a defined limit according to some embodiments.

Turning to FIG. 10, some owner of the vehicle tollway transponder 112 may want to pre-authorize to charge accumulate tolls up to a defined limit. The registered terminal 118 is used to send a pre-authorization message. At step 1000, the server device 100 receives, from the registered terminal 118, a pre-authorization message containing an indication of a pre-authorization to charge accumulated tolls up to a defined limit. At step 902, the indication of the pre-authorization to charge accumulated tolls up to the defined limit are stored in the database 202 and are associated with the tollway transponder identifier in which the registered terminal 118 is associated.

Many users of vehicle tollway transponders 114 use a toll system frequently to drive to and from their homes and work locations and other locations. In one embodiment, the toll system uses a trusted traveler rule to reduce the number of times the user has to approve or deny a toll charge. The trusted traveler rule may be based on the length of time the user has used the vehicle tollway transponder 112, the account history of the account associated with the vehicle tollway transponder 112 of the user, the ratio of toll charge approvals to toll charge lack of approvals, whether the vehicle tollway transponder 112 is in the user's "home" toll system, etc.

Figure 11:
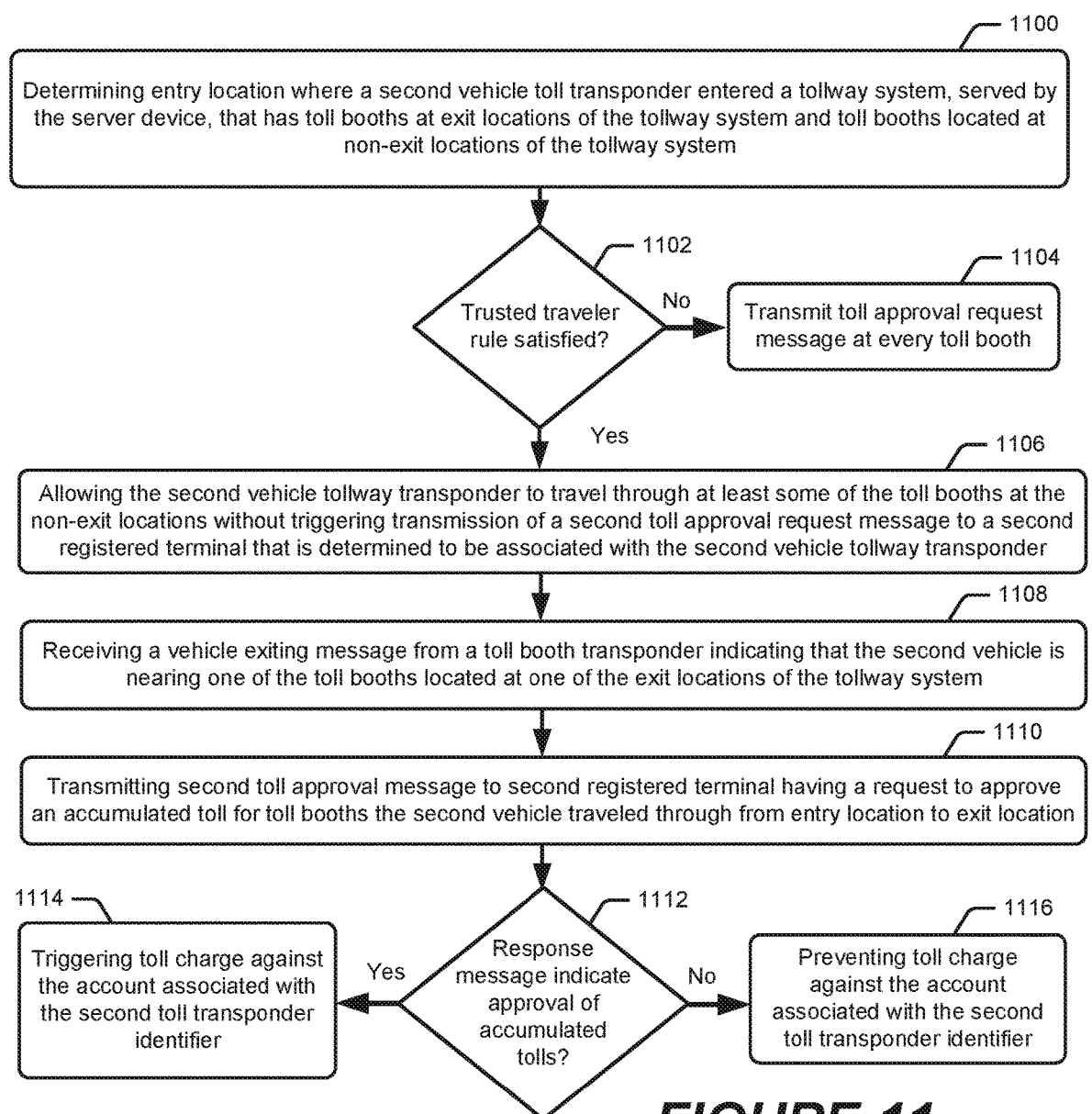
FIG. 11 is a flowchart illustrating operations to trigger or prevent toll charges for a trusted traveler according to some embodiments.

FIG. 11 illustrates operations to trigger toll charges or prevent toll charges of a trusted traveler. At step 1100, the entry location of where the vehicle tollway transponder 112 entered a tollway system served by the server device 100 is determined by the tollway system via the sensor 110 at the tollway entrance used by the vehicle 114 having vehicle tollway transponder 112. The tollway system generally has toll booths at entry locations and exit locations and at non-exit locations of the tollway system. The server device 100 receives the tollway transponder identifier and based on the tollway transponder identifier, receives the account information associated with the tollway transponder identifier. The server device 100 may receive the account information from the database 202 or from the fixed communication device 102. The account information includes information used to determine if the account is of a trusted traveler. Based on the account information, the determines if the trusted traveler rule is satisfied for the user associated with the tollway transponder identifier at step 1102. If the trusted traveler rule is not satisfied, the server device 100 transmits the toll approval request message at every toll booth as described above at step 1104.

If the trusted traveler rule is satisfied for the user associated with the tollway transponder identifier, at step 1106, the server device 100 allows the vehicle 114 of the vehicle tollway transponder 114 to travel through at least some of the toll booths at the non-exit locations without triggering transmission of a toll approval request message to the registered terminal 118 that is determined to be associated with the vehicle toll transponder 114.

At step 1108, the server device 100 receives a vehicle exiting message from a toll booth transponder such as sensor 110, via the fixed communication device 102, indicating that the vehicle is nearing one of the toll booths located at one of the exit locations of the tollway system. At step 1110, the server device 110 transmits a second toll approval message to the registered terminal associated with the vehicle tollway transponder to approve an accumulated toll for toll booths the vehicle traveled through from the entry location to the exit location.

The registered terminal device 118 receives the toll approval message, receives the user input, and responds with a response message indicating approval or lack of approval of the accumulated tolls. At step 1112, the server device 100 receives the response message and determines whether the response message indicates approval or lack of approval of the accumulated tolls. If the response message indicates approval of the accumulated tolls, at step 1114, the server device 100 triggers a toll charge for the accumulated tolls against the account associated with the tollway transponder identifier. At step 1116, the server device 100 prevents a toll charge for the accumulated tolls against the account associated with the tollway transponder identifier.

Figure 12:
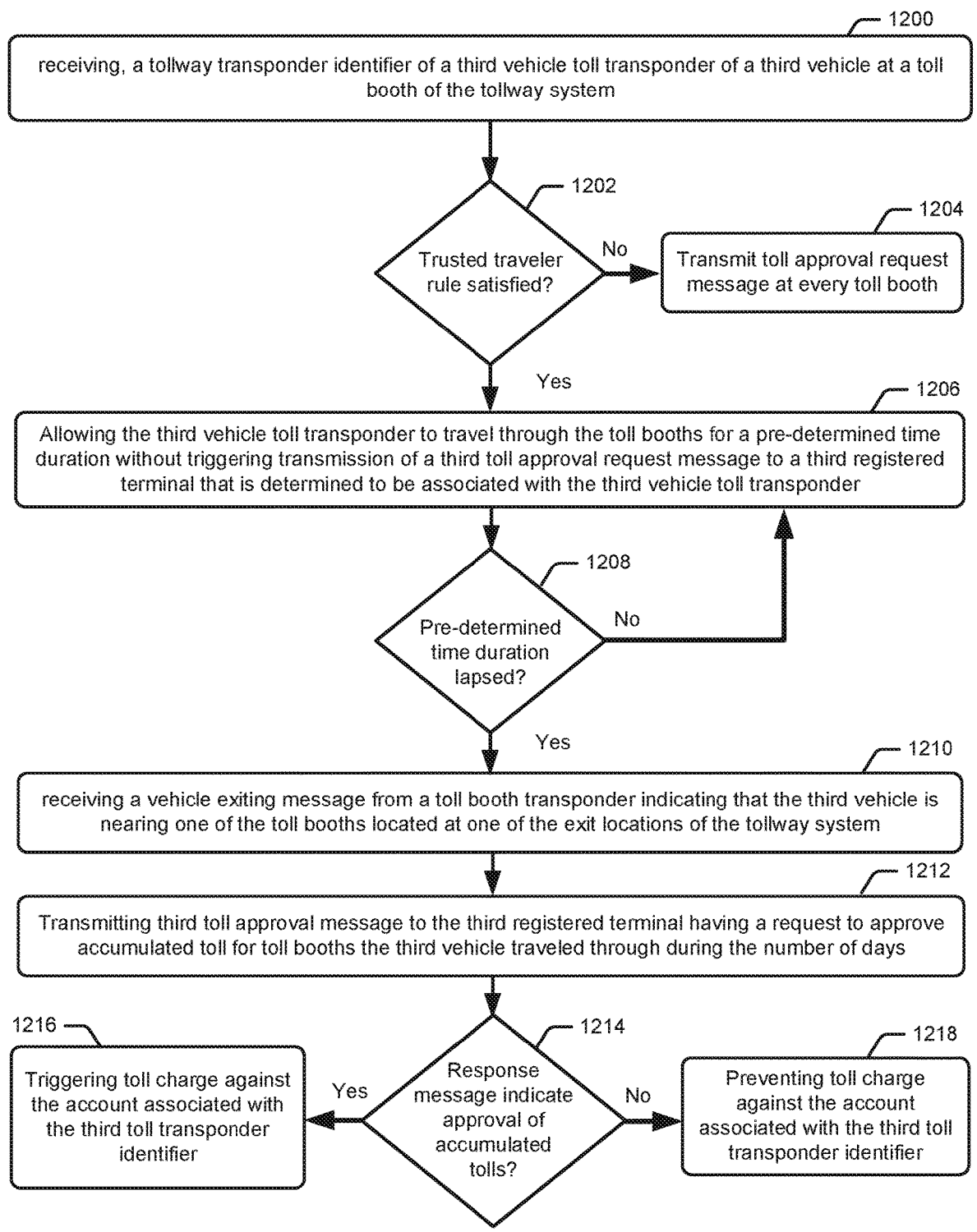
FIG. 12 is a flowchart illustrating operations to trigger or prevent toll charges of a trusted traveler for a pre-determined time duration according to some embodiments.

In a further embodiment using the trusted traveler rule to reduce the number of times the user has to approve or deny a toll charge against an account, a time duration is used to accumulate toll charges. Turning to FIG. 12, a tollway transponder identifier of a vehicle tollway transponder 112 is sensed at a toll booth of a tollway system. At step 1200, the server device 100 receive a tollway transponder identifier of a vehicle tollway transponder 112 of a vehicle 114. The server device 100 receives the tollway transponder identifier and based on the tollway transponder identifier, receives the account information associated with the tollway transponder identifier. The server device 100 may receive the account information from the database 202 or from the fixed communication device 102. The account information includes information used to determine if the account is of a trusted traveler. Based on the account information, the determines if the trusted traveler rule is satisfied for the user associated with the tollway transponder identifier at step 1202. For example, a determination may be made whether the vehicle tollway transponder 112 entered the tollway system with a pattern over time that satisfies the trusted traveler rule. If the trusted traveler rule is not satisfied, the server device 100 transmits the toll approval request message at every toll booth as described above at step 1204.

If the trusted traveler rule is satisfied, at step 1206, the vehicle tollway transponder 112 is allowed to travel through the toll booths for a pre-determined time duration without triggering transmission of a toll approval request message to the registered terminal associated with the tollway transponder identifier of the vehicle tollway transponder 112. The server device 100 determines if the pre-determined time duration has lapsed at step 1208. The pre-determined time duration may be specified in terms of days, weeks, months, etc. After the pre-determined time duration has lapsed, the server device 100 receives, via the fixed communication device 102, a vehicle exiting message from a toll booth sensor 110 indicating that the vehicle tollway transponder 112 is nearing one of the toll booths located at one of the exit locations of the tollway system at step 1210.

At step 1212, responsive to receiving the vehicle exiting message, the server device 100 transmits a toll approval request message to the registered terminal having a request to approve an accumulated toll for the toll booths the vehicle tollway transponder 112 traveled through during the pre-determined time duration. The registered terminal device 118 receives the toll approval message, receives the user input, and responds with a response message indicating approval or lack of approval of the accumulated tolls. At step 1214, the server device 100 receives the response message and determines whether the response message indicates approval or lack of approval of the accumulated tolls. If the response message indicates approval of the accumulated tolls, at step 1216, the server device 100 triggers a toll charge for the accumulated tolls against the account associated with the tollway transponder identifier. At step 1218, the server device 100 prevents a toll charge for the accumulated tolls against the account associated with the tollway transponder identifier responsive to the response message indicating lack of approval of the accumulated tolls.

Figure 13:
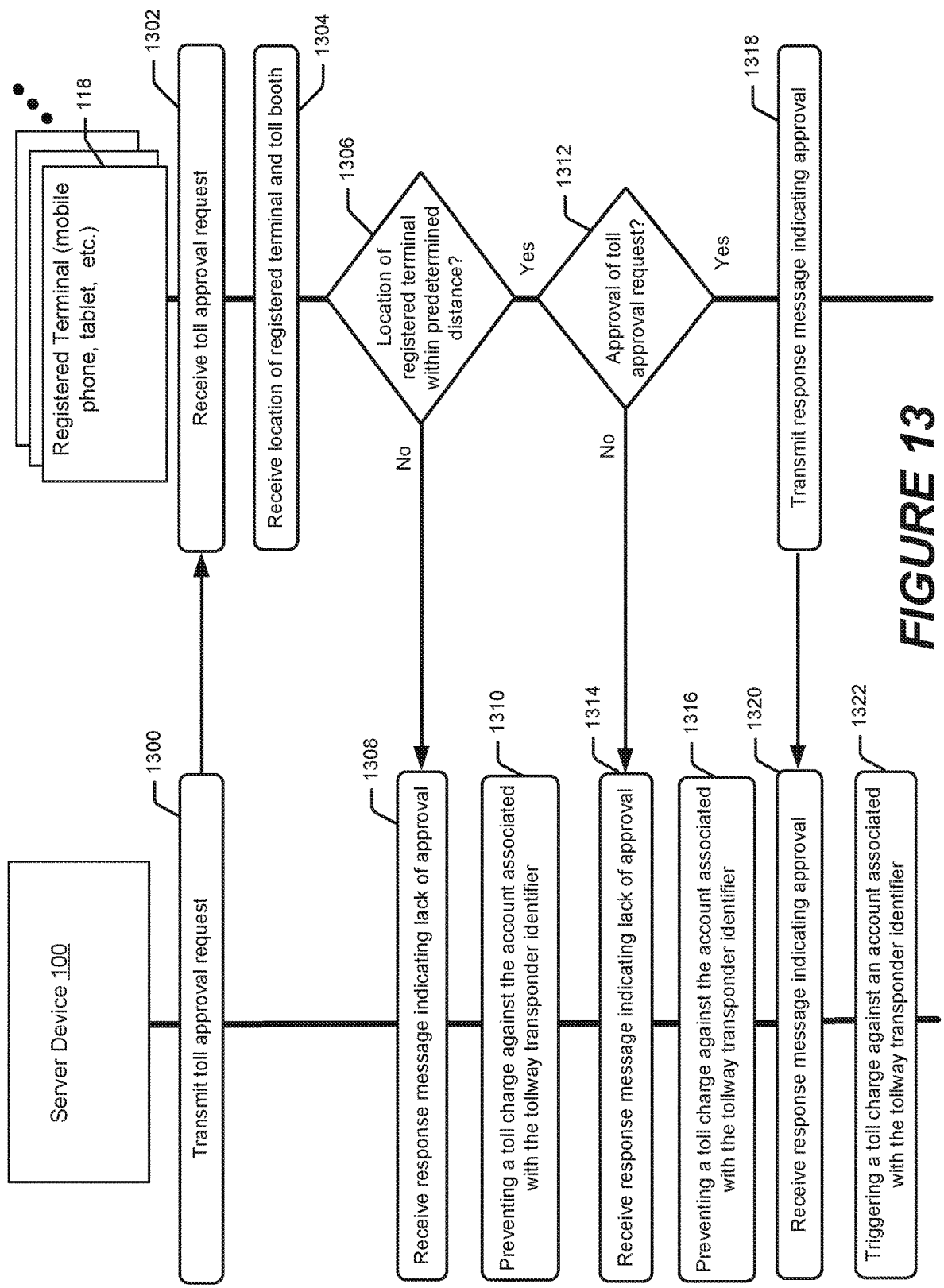
FIG. 13 is an exemplary signaling diagram for illustrating procedures according to an embodiment.

Turning now to FIG. 13, in an alternate embodiment, the registered terminal 114 determines if the location of the registered terminal is within a pre-defined distance of a tollbooth. In this embodiment, the server device 100 receives from the fixed communication device 102 a tollway transponder identifier of a vehicle tollway transponder 112 of a vehicle 114 that was sensed by sensor 110 as the vehicle 114 came within range of the sensor 110. The server device 100 receives the tollway transponder identifier and identifies the registered terminal associated with the tollway transponder identifier. At step 1300, the server device sends a toll approval request message to the registered terminal 118. At step 1302, the registered terminal 118 receives the toll approval request.

At step 1304, the registered terminal receives the location of the registered terminal 118 and the tollbooth 104. The location of the registered terminal may be received from an application on the registered terminal 118, from a server node of the wireless network the registered terminal is connected to, etc. The location of the registered terminal 118 may be received from the server device 100 as part of the toll approval request or in a separate message from the server device 100 or from the fixed communication device 102.

At step 1306, the registered terminal 118 compares the location of the toll booth with a location of the registered terminal to determine if the location of the registered terminal 118 is within a predetermined distance of the location of the toll booth 104. The predetermined distance may be based on the average speed of the vehicle and an average time between the toll approval request being sent and the sending of the response message, a fixed distance, etc. If the location of the registered terminal 118 is not within the predetermined distance of the toll booth location, the registered terminal 118 sends a response message indicating lack of approval of the toll request to the server device 100. The server device 100 at step 1310 prevents a toll charge against the account associated with the tollway transponder identifier.

If the location of the registered terminal 118 is within the predetermined distance from the location of the toll booth 102, the registered terminal 118 determines whether approval is to be provided in response to the toll approval request based on input from the user of the registered terminal 118. Responsive to determining that approval is not to be provided, the registered terminal transmits a response message indicating lack of approval of the toll charge to the server device 100. At step 1314, the server device 100 receives the message indicating lack of approval of the toll charge against the account associated with the tollway transponder identifier. The server device 100 prevents a toll charge against the account associated with the tollway transponder identifier at step 1316.

Responsive to determining that approval to the toll charge is to be provided, at step 1318, the registered terminal 118 transmits a response message to the server device 100 indicating approval of the toll against the account associated with the tollway transponder identifier. The server device 100 receives the response message indicating approval at step 1320. At step 1322, the server device 100 triggers a toll charge against the account associated with the tollway transponder identifier.

Figure 14:
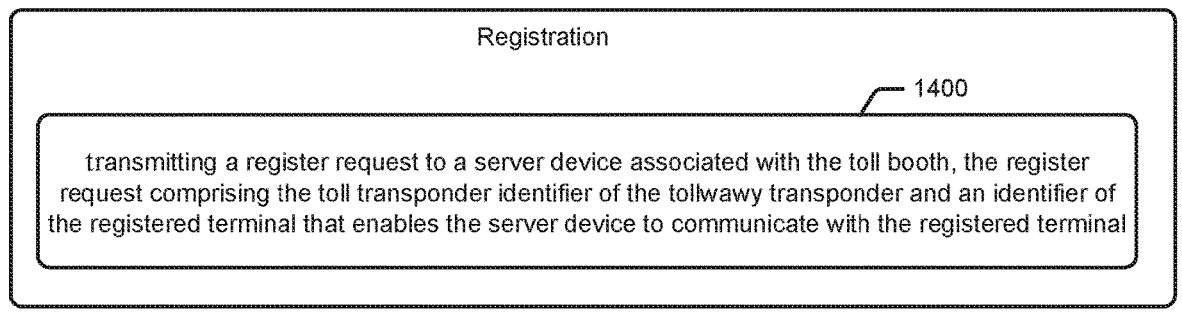
FIG. 14 is a flowchart illustrating operations to register a terminal according to some embodiments.

FIG. 14 illustrates registering a device from the perspective of the registered terminal 118. At step 1400, the device transmits a register request to server device 100. The register request comprises the toll transponder identifier of the tollway transponder and an identifier of the registered terminal that enables the server device to communicate with the registered terminal.

Figure 15:
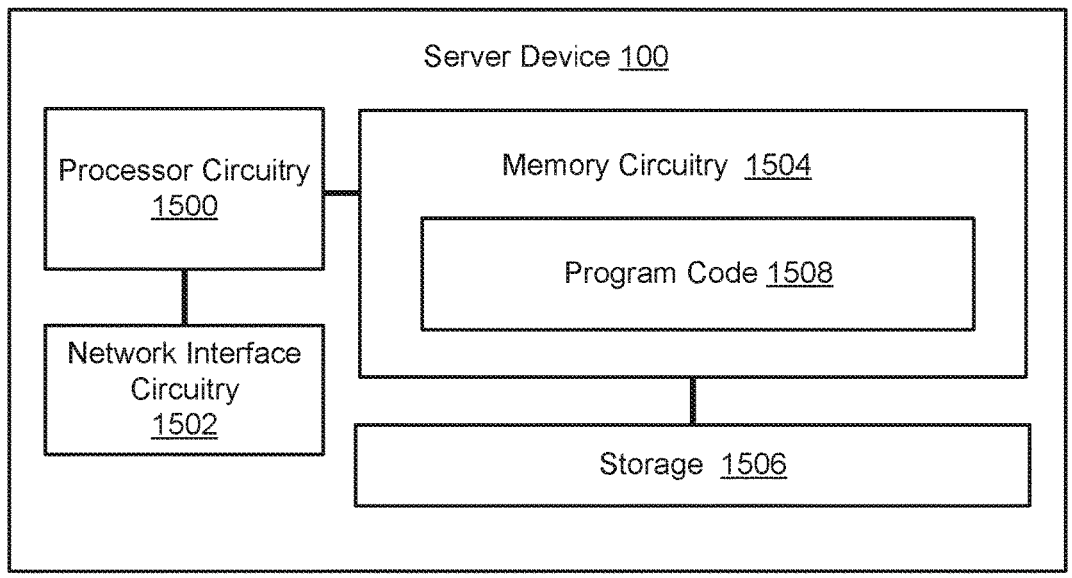
FIG. 15 is a block diagram of a server device according to some embodiments.

FIG. 15 provides an overview diagram of a suitable computer hardware and computing environment in conjunction with which various embodiments of the server device 100 may be practiced. The description of FIG. 15 is intended to provide a brief, general description in conjunction with which the subject matter described herein may be implemented. In some embodiments, the subject matter is described in the general context of computer-executable instructions, such as program modules, being executed by a computer, such as a personal computer. Generally, program modules include routines, programs, objects, components, data structures, and the like, that perform particular functions described above. Moreover, those skilled in the art will appreciate that the subject matter may be practiced with other computer system configurations, including hand-held devices, multiprocessor systems, microprocessor-based or programmable consumer electronics, network PCs, minicomputers, mainframe computers, and the like. As used herein, a "processor" includes one or more processors, microprocessors, computers, co-processors, graphics processors, digital signal processors, arithmetic logic units, system-on-chip processors, etc. The subject matter may also be practiced in distributed computer environments where tasks are performed by I/O remote processing devices that are linked through a communications network. In a distributed computing environment, program modules may be located in both local and remote memory storage devices.

In the embodiment shown in FIG. 15, a hardware and operating environment is provided that is applicable to the server device 100 shown in the other figures. As shown in FIG. 15, one embodiment of the hardware and operating environment includes processing circuitry 1500 having one or more processing units coupled to the network interface circuitry 1502 and a memory circuitry 1504. The memory circuitry 1504 may include a ROM, e.g., a flash ROM, a RAM, e.g., a DRAM or SRAM, or the like and includes suitably configured program code 1508 to be executed by the processing circuitry so as to implement the above described functionalities of the server device 100. The storage 1506 may include a mass storage, e.g., a hard disk or solid state disk, or the like. There may be only one or more than one processing unit, such that the processor circuitry 1500 of server 100, 102 comprises a single central-processing unit (CPU), or a plurality of processing units, commonly referred to as a multiprocessor or parallel-processor environment. A multiprocessor system can include cloud computing environments.

Figure 16:
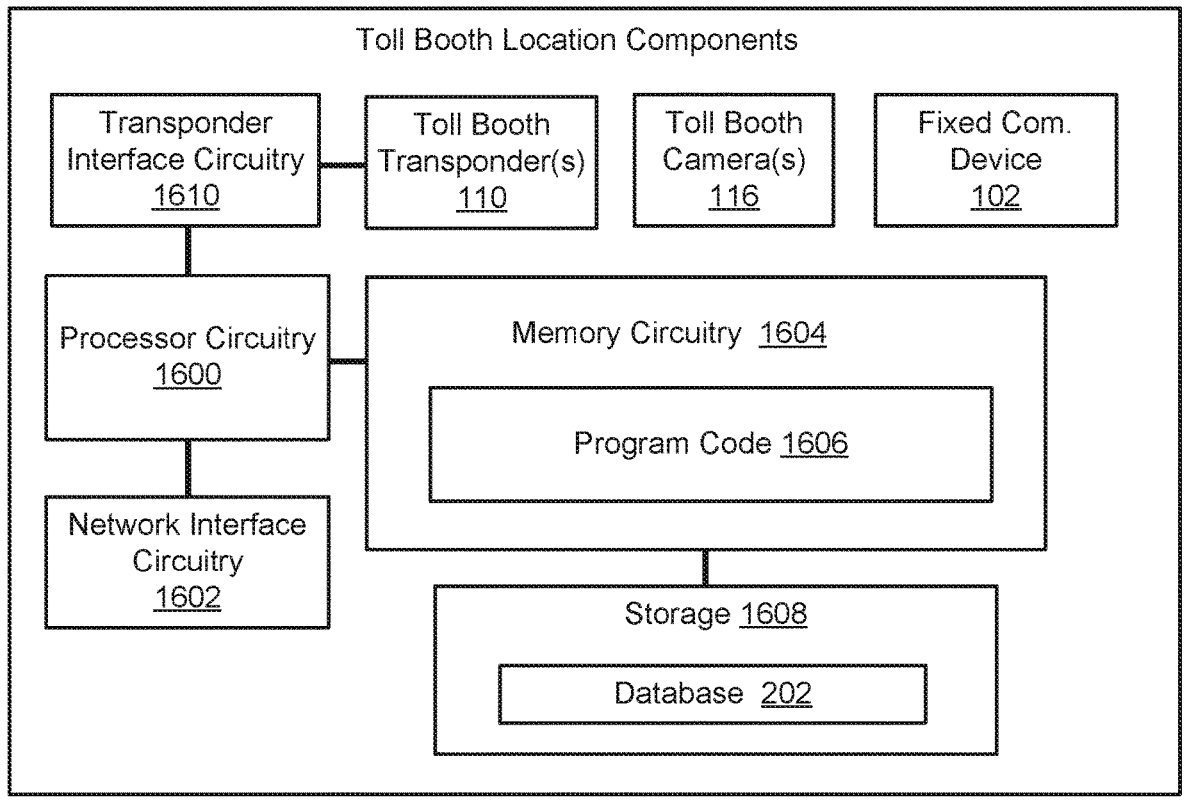
FIG. 16 is a block diagram of components of a toll booth location according to some embodiments.

FIG. 16 provides an overview diagram of a suitable computer hardware and computing environment in conjunction with which various embodiments of toll booth components may be practiced. The description of FIG. 16 is intended to provide a brief, general description in conjunction with which the subject matter may be implemented. In some embodiments, the invention is described in the general context of computer-executable instructions, such as program modules, being executed by a computer, such as a personal computer. Generally, program modules include routines, programs, objects, components, data structures, and the like, that perform particular tasks or implement particular abstract data types.

In the embodiment shown in FIG. 16, a hardware and operating environment is provided that is applicable to the toll booth component operations described in the other figures and described above. Moreover, those skilled in the art will appreciate that the subject matter may be practiced with other computer system configurations, including handheld devices, multiprocessor systems, microprocessor-based or programmable consumer electronics, network PCs, minicomputers, mainframe computers, and the like. As used herein, a "processor" includes one or more processors, microprocessors, computers, co-processors, graphics processors, digital signal processors, arithmetic logic units, system-on-chip processors, etc. The subject matter may also be practiced in distributed computer environments where tasks are performed by I/O remote processing devices that are linked through a communications network. In a distributed computing environment, program modules may be located in both local and remote memory storage devices.

In the embodiment shown in FIG. 16, a hardware and operating environment is provided that is applicable to the toll booth 104 shown in the other figures. As shown in FIG. 16, one embodiment of the hardware and operating environment includes processing circuitry 1600 having one or more processing units coupled to the network interface circuitry 1602 and a memory circuitry 1604. The memory circuitry 1604 may include a ROM, e.g., a flash ROM, a RAM, e.g., a DRAM or SRAM, or the like and includes suitably configured program code 1606 to be executed by the processing circuitry so as to implement that above described functionalities of the toll booth 104. The storage 1608 may include a mass storage, e.g., a hard disk or solid state disk, or the like. Storage 1608 includes database 202 that stores the tollway transponder identifier, registered terminal information associated with the tollway transponder identifier, and account information associated with the tollway transponder identifier. For example, there may be an entry for each tollway transponder identifier containing the tollway transponder identifier, associated registered terminal information, and associated account information. There may be only one or more than one processing unit, such that the processor circuitry 1600 of toll booth 104 comprises a single central-processing unit (CPU), or a plurality of processing units, commonly referred to as a multiprocessor or parallel-processor environment. A multiprocessor system can include cloud computing environments.

The toll booth 104 further includes transponder interface circuitry 1610 that communicates with the toll booth transponders (i.e., sensors) 110, the toll booth camera(s) 116, and the fixed communication device 102

Figure 17:
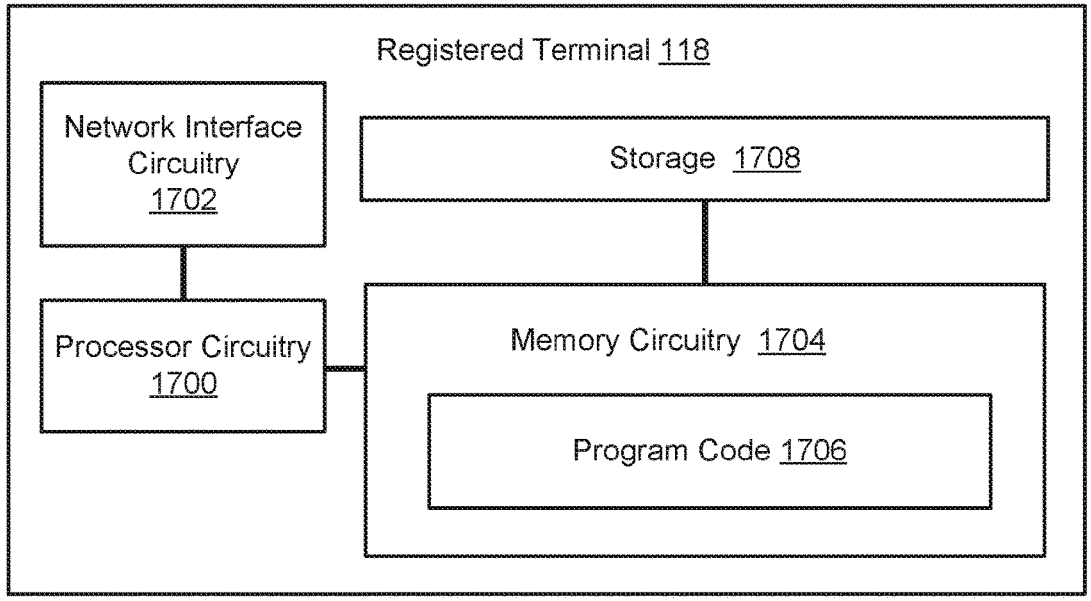
FIG. 17 is a block diagram of a terminal device according to some embodiments.

FIG. 17 provides an overview diagram of a suitable computer hardware and computing environment in conjunction with which various embodiments of the registered terminal 118 may be practiced. The description of FIG. 17 is intended to provide a brief, general description in conjunction with which the subject matter may be implemented. In some embodiments, the subject matter is described in the general context of computer-executable instructions, such as program modules, being executed by a computer, such as a personal computer. Generally, program modules include routines, programs, objects, components, data structures, and the like, that perform particular tasks or implement particular abstract data types.

In the embodiment shown in FIG. 17, a hardware and operating environment is provided that is applicable to the firewall operations described in the other figures and described above. Moreover, those skilled in the art will appreciate that the subject matter may be practiced with other computer system configurations, including multiprocessor systems, microprocessor-based or programmable consumer electronics, network PCs, minicomputers, mainframe computers, and the like. As used herein, a "processor" includes one or more processors, microprocessors, computers, co-processors, graphics processors, digital signal processors, arithmetic logic units, system-on-chip processors, etc. The subject matter may also be practiced in distributed computer environments where tasks are performed by I/O remote processing devices that are linked through a communications network. In a distributed computing environment, program modules may be located in both local and remote memory storage devices.

In the embodiment shown in FIG. 17, a hardware and operating environment is provided that is applicable to the registered terminal 118 shown in the other figures. As shown in FIG. 17, one embodiment of the hardware and operating environment includes processing circuitry 1700 having one or more processing units coupled to the network interface circuitry 1702 and a memory circuitry 1704. The memory circuitry 1704 may include a ROM, e.g., a flash ROM, a RAM, e.g., a DRAM or SRAM, or the like and includes suitably configured program code 1706 to be executed by the processing circuitry so as to implement that above described functionalities of the registered terminal. The storage 1708 may include a mass storage, e.g., a hard disk or solid-state disk, or the like. There may be only one or more than one processing unit, such that the processor circuitry 1700 of registered terminal 118 comprises a single central-processing unit (CPU), or a plurality of processing units, commonly referred to as a multiprocessor or parallel-processor environment. A multiprocessor system can include cloud computing environments.

Thus, example systems, methods, and tangible machine readable media for requiring an approval message from a registered terminal to be received to trigger a toll charge against an account associated with a tollway transponder identifier or alternatively triggering a toll charge against the account if the location of the registered terminal is within a defined distance of a toll booth location, and rejecting a toll charge if a message indicating lack of approval is received from the registered terminal or if the registered terminal is outside of the defined distance have been described. The advantages provided include reduction in fraudulent toll charges, reduction in tollway transponder sticker theft, and the like.

As will be appreciated by one of skill in the art, the present inventive concepts may be embodied as a method, data processing system, or computer program product. Furthermore, the present inventive concepts may take the form of a computer program product on a tangible computer usable storage medium having computer program code embodied in the medium that can be executed by a computer. Any suitable tangible computer readable medium may be utilized including hard disks, CD ROMs, optical storage devices, or magnetic storage devices.

Some embodiments are described herein with reference to flowchart illustrations or block diagrams of methods, systems and computer program products. It will be understood that each block of the flowchart illustrations or block diagrams, and combinations of blocks in the flowchart illustrations or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart or block diagram block or blocks.

These computer program instructions may also be stored in a computer readable memory that can direct a computer or other programmable data processing apparatus to function in a particular manner, such that the instructions stored in the computer readable memory produce an article of manufacture including instruction means which implement the function/act specified in the flowchart or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations described herein may be written in an object oriented programming language such as Java® or C++. However, the computer program code for carrying out operations described herein may also be written in conventional procedural programming languages, such as the "C" programming language. The program code may execute entirely on the user's computer, partly on the user's computer, as a standalone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way or combination, and the present specification, including the drawings, shall be construed to constitute a complete written description of all combinations and subcombinations of the embodiments described herein, and of the manner and process of making and using them, and shall support claims to any such combination or subcombination.

In the drawings and specification, there have been disclosed typical embodiments and, although specific terms are employed, they are used in a generic and descriptive sense only and not for purposes of limitation, the scope of the inventive concepts being set forth in the following claims.

The invention claimed is:

1. A method in a server device comprising
receiving, from a fixed communication device at a toll booth location, a tollway transponder identifier of a vehicle tollway transponder on a vehicle;
determining whether a registered terminal is associated with the tollway transponder identifier;
responsive to determining that the registered terminal is associated with the tollway transponder identifier, transmitting a toll approval request message to the registered terminal, the toll approval request message having a request to approve a toll charge associated with the tollbooth location; and
responsive to receiving a response message from the registered terminal to the toll approval request message, performing:
determining if a location of the registered terminal is within a defined distance from the toll booth location; and
responsive to the location of the registered terminal being within the defined distance, triggering the toll charge against an account associated with the tollway transponder identifier when the response message indicates approval of the toll charge.

2. The method of claim 1, further comprising:
responsive to the location of the registered terminal being within the defined distance and responsive to receiving a response message indicating lack of approval of the toll, preventing a toll charge against the account associated with the tollway transponder identifier.

3. The method of claim 1, further comprising
responsive to no registered terminal being associated with the tollway transponder identifier, preventing a toll charge against the account associated with the tollway transponder identifier.

4. The method of claim 1, further comprising:
receiving, from a user terminal a registration request comprising an identifier that is used to identify the user terminal as the registered terminal; and
associating the identifier of the registered terminal with the tollway transponder identifier in a database that is queried by the server device,
wherein determining whether the registered terminal is associated with the tollway transponder identifier comprises determining whether the identifier of the registered terminal is associated in the database with the tollway transponder identifier.

5. The method of claim 1, further comprising: responsive to receiving a response message indicating lack of approval of the toll, communicating a toll rejected warning notification to the fixed communication device at the toll booth location identifying that a vehicle is passing through the location without toll authorization.

6. The method of claim 1, further comprising receiving, from the registered terminal, a pre-authorization message containing an indication of a planned route and an indication of pre-authorization to charge accumulated tolls along the planned route.

7. The method of claim 1, further comprising receiving, from the registered terminal, a pre-authorization message containing an indication of pre-authorization to charge accumulated tolls up to a defined limit.

8. A server device comprising:
a processor and a memory coupled to the processor, wherein the memory stores computer program instructions that are executed by the processor to perform operations comprising:
receiving, from a fixed communication device at a toll booth location, a tollway transponder identifier of a vehicle tollway transponder on a vehicle, the tollway transponder identifier sensed by a toll booth sensor of a toll booth at the toll booth location;
responsive to determining that a registered terminal is associated with the tollway transponder identifier, transmitting a toll approval request message to the registered terminal, the toll approval request message having a request to approve a toll charge associated with the tollbooth location; and responsive to receiving a response message from the registered terminal to the toll approval request message, performing:
  determining if a location of the registered terminal is within a defined distance of a toll booth location; and
  responsive to the location of the registered terminal being within the defined distance, triggering the toll charge against an account associated with the tollway transponder identifier when the response message indicates approval of the toll charge.

9. The server device of claim 8, the operations further comprising:
responsive to not receiving a response from the registered terminal within the allocated time period, performing:
  determining a location of the registered terminal responsive to the registered terminal being detectable after the allocated time period has expired;
  comparing the location of the registered terminal to the toll booth location;
  responsive to the location of the registered terminal being within the defined distance of the toll booth location, triggering a toll charge against the account associated with the tollway transponder identifier; and
  responsive to the location of the registered terminal being outside of the defined distance, preventing a toll charge against the account associated with the tollway transponder identifier.

10. The server device of claim 9, the operations further comprising:
responsive to the registered terminal not being detectable after the allocated time period has expired, preventing a charge against the account associated with the tollway transponder identifier.

11. The server device of claim 8, the operations further comprising:
receiving a setup message from the fixed communication device at the toll booth location, the setup message containing an indicated distance between a toll booth transponder and the toll booth location;
determining a threshold time period based on the indicated distance; and
responsive to not receiving a response message from the registered terminal to the toll approval request message within the threshold time period, preventing a toll charge against the account associated with the tollway transponder.

12. The server device of claim 11, wherein the threshold time period is determined based on an expected speed of vehicles traveling between the toll booth transponder and the toll booth location.

13. The server device of claim 11, wherein the threshold time period is determined based on
  measuring an average speed of vehicles traveling at the toll booth location; and
  determining the threshold time period based on the average speed of the vehicles.

14. A server device comprising:
a processor and a memory coupled to the processor, wherein the memory stores computer program instructions that are executed by the processor to perform operations comprising:
  receiving, from a fixed communication device at a toll booth location, a tollway transponder identifier of a vehicle tollway transponder on a vehicle;
  responsive to determining that a registered terminal is associated with the tollway transponder identifier, transmitting a toll approval request message to the registered terminal;
  responsive to receiving a response message from the registered terminal to the toll approval request message, performing:
    determining if a location of the registered terminal is within a defined distance of a toll booth location; and
    responsive to the location of the registered terminal being within the defined distance, triggering a toll charge against an account associated with the tollway transponder identifier when the response message indicates approval of the toll charge;
  determining an entry location where a second vehicle tollway transponder of a second vehicle entered a tollway system, served by the server device, that has toll booths at exit locations of the tollway system and toll booths located at non-exit locations of the tollway system;
  determining whether the second vehicle tollway transponder entered the tollway system at the entry location with a pattern over time that satisfies a trusted traveler rule; responsive to determining that the trusted traveler rule is satisfied:
    allowing the second vehicle tollway transponder to travel through at least some of the toll booths at the non-exit locations without triggering transmission of a second toll approval request message to a second registered terminal that is determined to be associated with the second vehicle tollway transponder;
  receiving a vehicle exiting message from a toll booth transponder indicating that the second vehicle is nearing one of the toll booths located at one of the exit locations of the tollway system;
  responsive to receiving the vehicle exiting message:
    transmitting the second toll approval request message to the second registered terminal, the second toll approval request message having a request to approve an accumulated toll for the toll booths the second vehicle transponder traveled through from the entry location to the one of the exit locations;
    triggering a charge for the accumulated toll against the account associated with the second vehicle transponder responsive to receiving a second response message indicating approval of the accumulated tolls; and
    preventing a charge for the accumulated toll against the account associated with the second vehicle tollway transponder responsive to the second response message indicating lack of approval of the accumulated tolls.

15. A server device which serves a tollway system having toll booths located at exit locations and toll booths located at non-exit locations of the tollway system, the server device comprising:
a processor and a memory coupled to the processor, wherein the memory stores computer program instructions that are executed by the processor to perform operations comprising:
  receiving, from a fixed communication device at a toll booth location, a tollway transponder identifier of a vehicle tollway transponder on a vehicle;

responsive to determining that a registered terminal is associated with the tollway transponder identifier, transmitting a toll approval request message to the registered terminal;

responsive to receiving a response message from the registered terminal to the toll approval request message, performing:

determining if a location of the registered terminal is within a defined distance of a toll booth location; and responsive to the location of the registered terminal being within the defined distance, triggering a toll charge against an account associated with the tollway transponder identifier when the response message indicates approval of the toll charge;

receiving, a tollway transponder identifier of a second vehicle tollway transponder of a third vehicle at a toll booth of the tollway system;

determining whether the second vehicle tollway transponder entered the tollway system with a pattern over time that satisfies a trusted traveler rule; and responsive to determining that the trusted traveler rule is satisfied, performing:

allowing the second vehicle tollway transponder to travel through the toll booths for a pre-determined time duration without triggering transmission of a second toll approval request message to a second registered terminal that is determined to be associated with the second transponder identifier;

after the pre-determined time duration has lapsed, receiving a vehicle exiting message from a toll booth transponder indicating that the second vehicle tollway transponder is nearing one of the toll booths located at one of the exit locations of the tollway system; and responsive to receiving the vehicle exiting message, performing:

transmitting a second toll approval request message to the second registered terminal, the second toll approval request message having a request to approve an accumulated toll for the toll booths the second vehicle transponder traveled through during the pre-determined time duration;

triggering a charge for the accumulated toll against the account associated with the second vehicle transponder responsive to receiving a second response message indicating approval of the accumulated tolls; and preventing a charge for the accumulated toll against the account associated with the second vehicle tollway transponder responsive to the second response message indicating lack of approval of the accumulated tolls.

16. A registered terminal comprising:

a communication interface configured to communicate with a server device;

a processor in communication with the communication interface and configured to perform operations comprising:

receiving, from the server device via the communication interface, a toll approval request message for approval of a toll, the toll approval request message comprising a location of a toll booth requesting toll approval and an amount of the toll and comprising a location of the toll booth;

comparing the location of the toll booth with a location of the registered terminal;

responsive to the location of the toll booth being outside a predetermined distance from the location of the registered terminal, sending a response message to the server device via the communication interface indicating a lack of approval of the toll against an account associated with a tollway transponder identifier that is associated with the registered terminal; and responsive to the location of the toll booth being within the predetermined distance from the location of the registered terminal:

determining whether approval is to be provided in response to the toll approval request;

responsive to determining that approval is to be provided, transmitting, via the communication interface, a response message to the server device indication approval of the toll against the account associated with the tollway transponder identifier; and responsive to determining that approval is not to be provided, transmitting, via the communication interface, a response message indicating lack of approval of the toll.

17. The registered terminal of claim 16, wherein the processor performs further operations comprising:

transmitting a registration request to the server device, the registration request comprising the tollway transponder identifier of the tollway transponder and an identifier of the registered terminal that enables the server device to communicate with the registered terminal.

18. The registered terminal of claim 16 wherein the processor performs further operations comprising:

obtaining a planned travel route of the registration terminal; and transmitting, to the server device via the communication interface, a pre-authorization message containing an indication of the planned travel route and an indication of pre-authorization to charge accumulated tolls along the planned travel route.

19. The registered terminal of claim 16, the operations further comprising:

transmitting, to the server device via the communication interface, a pre-authorization message containing an indication of pre-authorization to charge accumulated toll up to a defined limit.

20. The registered terminal of claim 19, wherein the pre-authorization message further contains an indication of a time duration during which the pre-authorization to charge remains valid.

* * * * *